United States Patent
Huang

(10) Patent No.: US 8,072,897 B2
(45) Date of Patent: Dec. 6, 2011

(54) METHOD, SYSTEM AND DEVICE FOR SELECTING EDGE CONNECTION LINK ACROSS DIFFERENT MANAGEMENT DOMAIN NETWORKS

(75) Inventor: Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 12/329,270

(22) Filed: Dec. 5, 2008

(65) Prior Publication Data

US 2009/0086744 A1 Apr. 2, 2009

Related U.S. Application Data

(63) Continuation of application No. PCT/CN2007/070069, filed on May 31, 2007.

(30) Foreign Application Priority Data

Jun. 5, 2006 (CN) .......................... 2006 1 0083534

(51) Int. Cl.
*H04J 3/14* (2006.01)

(52) U.S. Cl. ........ 370/252; 370/229; 370/254; 370/351; 370/389; 370/392; 370/401; 370/468; 709/238; 709/239; 709/244; 709/249

(58) Field of Classification Search .................. None
See application file for complete search history.

(56) References Cited

U.S. PATENT DOCUMENTS

| | | | | |
|---|---|---|---|---|
| 6,262,976 | B1 * | 7/2001 | McNamara | 370/254 |
| 2002/0051449 | A1 * | 5/2002 | Iwata | 370/389 |
| 2002/0194362 | A1 * | 12/2002 | Rawlins et al. | 709/235 |
| 2003/0076838 | A1 | 4/2003 | Shaio et al. | |
| 2003/0169470 | A1 * | 9/2003 | Alagar et al. | 359/110 |
| 2004/0039839 | A1 * | 2/2004 | Kalyanaraman et al. | 709/238 |
| 2004/0146056 | A1 * | 7/2004 | Martin | 370/401 |
| 2004/0202171 | A1 * | 10/2004 | Hama | 370/395.1 |

(Continued)

FOREIGN PATENT DOCUMENTS

CN 1592426 A 3/2005

(Continued)

OTHER PUBLICATIONS

PCT Written Opinion of the International Searching Authority (Aug. 16, 2007).

(Continued)

*Primary Examiner* — Hassan Phillips
*Assistant Examiner* — Ajay Cattungal
(74) *Attorney, Agent, or Firm* — Leydig, Voit & Mayer, Ltd.

(57) ABSTRACT

A method, system and device for selecting an edge connection link across different management domain networks. A plurality of links is provided between a first management domain network and a second management domain network. The method includes: determining, by a first resource management and control function entity in the first management domain network, a link to the second management domain network, and sending identifier information of the determined link to a second resource management and control function entity in the second management domain network; and determining, by the second resource management and control function entity, the link to the first management domain network, in accordance with the received identifier information of the determined link. The invention can implement selecting of an edge connection link across different management domain networks.

14 Claims, 4 Drawing Sheets

U.S. PATENT DOCUMENTS

| | | | |
|---|---|---|---|
| 2004/0264379 A1 | 12/2004 | Srikrishna et al. | |
| 2005/0157697 A1* | 7/2005 | Lee et al. | 370/349 |
| 2005/0259647 A1* | 11/2005 | Wakumoto et al. | 370/389 |
| 2006/0245426 A1 | 11/2006 | Rasanen | |
| 2007/0201513 A1* | 8/2007 | Anderson et al. | 370/468 |
| 2007/0242667 A1 | 10/2007 | Liu | |
| 2009/0073876 A1* | 3/2009 | Kimmich et al. | 370/229 |
| 2009/0103538 A1* | 4/2009 | Yoshimi | 370/392 |

FOREIGN PATENT DOCUMENTS

| | | | |
|---|---|---|---|
| CN | 1599327 A | 3/2005 | |
| CN | 1633099 A | 6/2005 | |
| CN | 100571185 C | 12/2009 | |
| EP | 1 816 789 A1 | 8/2007 | |
| WO | WO 2005/117348 A2 | 12/2005 | |
| WO | WO 2006/136895 A1 | 12/2006 | |
| WO | WO 2007/014506 A1 | 2/2007 | |

OTHER PUBLICATIONS

European Office Action (Dec. 3, 2009).

State Intellectual Property Office of the People's Republic of China, Examination Report in Chinese Patent Application No. 200610083534.0 (Apr. 3, 2009).

Ebata et al., "Inter-Domain QoS Provisioning and Accounting," *IETF Standard Working Draft*, 1-37 (Oct. 1999) http://draft-ebata-inter-domain-qos-acct-00.txt.

"Telecommunications and Internet Converged Services and Protocols for Advanced Networking (TISPAN); Resource and Admission Control Sub-system (RACS); Functional Architecture; Final draft ETSI ES 282 003," *ETSI Standards*, TISPAN (V2.1.0), 1-49 (Jun. 2006).

$2^{nd}$ Office Action in corresponding European Application No. 07721692.7 (Aug. 12, 2010).

\* cited by examiner

US 8,072,897 B2

METHOD, SYSTEM AND DEVICE FOR SELECTING EDGE CONNECTION LINK ACROSS DIFFERENT MANAGEMENT DOMAIN NETWORKS

CROSS-REFERENCE TO RELATED APPLICATIONS

This application is a continuation of International Patent Application No. PCT/CN2007/070069, filed May 31, 2007, which claims priority to Chinese Patent Application No. 200610083534.0, filed Jun. 5, 2006, both of which are hereby incorporated by reference in their entirety.

FIELD OF THE INVENTION

The present invention relates to technologies of enabling an edge connection between networks in a communication system, and, in particular, to a method, system, and device for selecting an edge connection link across different management domain networks.

BACKGROUND OF THE INVENTION

Quality of Service (QoS) is an important technology in the Next Generation Network (NGN), and the QoS control architecture of an access network has been proposed currently in the Telecommunication and Internet converged Services and Protocols for Advanced Networking (TISPAN). FIG. 1 illustrates a schematic diagram of the QoS control architecture of an access network, which can be divided into an access network; a core network; an Application Function (AF) by network affiliations, wherein the access network includes an Access Node (AN); an Access-Resource Admission Control Function (A-RACF); and an Internet Protocol-Edge Function (IP-EDGE). The core network includes a Session Policy Decision Function (SPDF) and a Core-Edge Gateway Function (C-BGF), which can be divided into a Resource Admission Control Subsystem (RACS), a transport layer, a Network Attachment Subsystem (NASS), and an AF, by network functions, where the RACS includes an A-RACF and a SPDF, and the transport layer includes an AN, an IP-EDGE, and a BGF.

The SPDF is a service-based policy decision module to provide the AF with a Gq' interface and a bearer service. A User Equipment (UE), when requesting for a service, establishes a session with the AF through the transport layer, and the AF extracts QoS request parameters from the service request in the session and initiates to the SPDF a QoS resource request, including a category of the service, a bandwidth, five-tuple information of a flow, a user identifier, a flow operation instruction, etc.; that is, the AF requests the SPDF to build a QoS channel at the transport layer for the specific service. The SPDF stores a policy rule, makes a service-based policy decision, locates the access network where the UE is located and the A-RACF therein, and transports the QoS resource request to the located A-RACF via an Rq interface, the A-RACF being responsible for QoS control of the service. The A-RACF performs QoS control of the service by a process as follows: the A-RACF receives a QoS resource request forwarded by the SPDF via the Rq interface, obtains provided subscription data and location information of the UE from the NASS via an e4 interface, determines whether to provide the UE with the QoS in accordance with the obtained information, and sends a response of admitting the QoS request or not to the SPDF, after bandwidth reservation of the access network and instructing the IP-EDGE and the AN at the transport layer of the access network to execute the QoS.

For an executable QoS resource request, the A-RACF transports a QoS execution operation command to the IP-EDGE and the AN via a RE interface and a Ra interface, in accordance with the flow operation instruction in the QoS resource request to instruct the IP-EDGE and the AN to reserve resources required by the QoS, and the SPDF instructs the C-BGF to reserve resources required by the QoS of the service via an Ia interface.

UE end-to-end QoS management, control and execution can be supported in the schematic diagram illustrated in FIG. 1. Furthermore, function divisions and interfaces for reference are provided for networks affiliated with different Network Service Providers (NSP), e.g. network operators, service providers, etc., and capabilities of authentication and charging between the networks affiliated with the different NSPs are provided.

Currently, an access network and a core network in the NGN are operated by different NSPs; that is, the access network and the core network are provided with different management domains, and this requires a capability of the access network to provide the UE with different core networks. Thus, there may be two or more IP-EDGEs in an access network, which are connected, respectively, with C-BGFs of two or more core networks, and if there is only one SPDF in each core network, then a plurality of SPDFs may be in signaling connection with the A-RACF in the access network, as illustrated in FIG. 2.

In FIG. 2, an access network can be connected to a core network affiliated with a NSP1 and a core network affiliated with a NSP2, and there is a plurality of link connections at the transport layer between the access network and the two core networks. The situation illustrated in FIG. 2 can be roughly divided into two primary scenarios: 1. there is a plurality of different IP-EDGEs in the access network, which are in one-to-one correspondence to C-BGFs of the core networks in different management domains; and 2. an IP-EDGE in the access network corresponds to the C-BGFs of the core networks in the different management domains. While reserving QoS resources for a service, the A-RACF of the access network has to locate a path over which the service traverses a boundary between the access network and the core network; otherwise, it is impossible to execute any QoS operation of the service. Accordingly, the Rq interface between the SPDF and the A-RACF is required to provide a capability to select a link of the different networks between the management domains, but the existing Rq interface has not yet supported the capability.

In the first scenario illustrated in FIG. 2, the A-RACF of the access network can obtain the identifier of the SPDF through the signaling connection and searches for a corresponding IP-EDGE, in accordance with its preset correspondence table of SPDF identifiers and IP-EDGEs, thereby establishing a link connection between the BGF and the IP-EDGE. In the second scenario illustrated in FIG. 2, a plurality of IP-EDGEs may be found from a search in the preset correspondence table of SPDF identifiers and IP-EDGEs, and, consequently, it is still impossible to select and further establish a link connection between the BGF and the IP-EDGE.

The above descriptions have been given merely taking establishment of a link between the access network and the core network in the NGN as an example, and actually there is no method for selecting an edge connection link across different management domain networks in the case of a plurality of links between the different management domain networks.

SUMMARY OF THE INVENTION

An embodiment of the invention provides a method for selecting an edge connection link across different management domain networks, and this method can implement selecting of an edge connection link across different management domain networks, in the case of a plurality of links between the different management domain networks.

An embodiment of the invention provides a system for selecting an edge connection link across different management domain networks, and this system can implement selecting of an edge connection link across different management domain networks, in the case of a plurality of links between the different management domain networks.

An embodiment of the invention provides a device for selecting an edge connection link across different management domain networks, and this device can implement selecting of an edge connection link across different management domain networks, in the case of a plurality of links between the different management domain networks.

The embodiments of the invention are implemented as follows.

A method for selecting an edge connection link across different management domain networks, where a plurality of links is provided between a first management domain network and a second management domain network.

The method includes: determining, by a first resource management and control function entity in the first management domain network, a link to the second management domain network, and sending identifier information of the determined link to a second resource management and control function entity of the second management domain network; and determining, by the second resource management and control function entity, the link to the first management domain network, in accordance with the received identifier information of the determined link.

A system for selecting an edge connection link across different management domain networks includes a first resource management and control function entity in a first management domain network and a second resource management and control function entity in a second management domain network. The first resource management and control function entity is adapted to determine a link to the second resource management and control function entities, and to send identifier information of the determined link to the second resource management and control function entity. The second resource management and control function entity is adapted to determine the link between the links to the first management domain network, in accordance with the received identifier information of the determined link.

A resource management and control function entity includes a link selection module and a sending module. The link selection module is adapted to determine a link between management domain networks, to generate identifier information of the determined link, and to generate a control command in accordance with the identifier information of the determined link. The sending module is adapted to send the identifier information of the determined link or the control command.

A network domain edge gateway includes a reception module and an execution module. The reception module is adapted to receive identifier information of a determined link or a control command. The execution module is adapted to perform link connection and/or resource control, in accordance with the identifier information of the determined link or the control command.

As apparent from the above solutions, when selecting an edge link between the different management domain networks in the embodiments of the invention, the first management domain network transports the information of the selected link between the networks to the second management domain network through signaling between the networks, and the second management domain network selects an edge connection path in accordance with the received information of the link between the networks, thereby implementing selecting of an edge connection link across the different management domain networks, in the case of a plurality of links between the different management domain networks.

DETAILED DESCRIPTION OF THE INVENTION

The invention is further described in details below by way of the embodiments with reference to the drawings to make the objects, technical schemes, and advantages of the invention more apparent.

In order to implement selecting of an edge connection link across different management domain network, in a method according to an embodiment of the invention, when signaling accompanied without any link, i.e. signaling identifying no link information, is used between two different management domain networks, one of the management domain networks transports identifier information of a selected link between the networks to the other management domain network through signaling between the networks, and the other management domain network selects an edge connection path, in accordance with the received identifier information of the link between the networks.

In an embodiment of the invention, two networks belonging to different management domains are connected. The two networks are respectively referred to as a first management domain network and a second management domain network. Each management domain network is provided with at least one resource management and control function entity responsible for resource management and control of the network domain, referred to as a first resource management and control function entity, and a second resource management and control function entity, respectively, which negotiate with one another through signaling to manage their own network resources and establish and maintain connection resources across the network domains. In an embodiment of the invention, a network domain edge gateway in the first management domain is referred to as a first network domain edge gateway, and a network domain edge gateway in the second management domain is referred to as a second network domain edge gateway.

Different management domain networks as referred to in an embodiment of the invention are networks operated by different operators or sub-networks divided in a network operated by the same operator.

Figure 3:
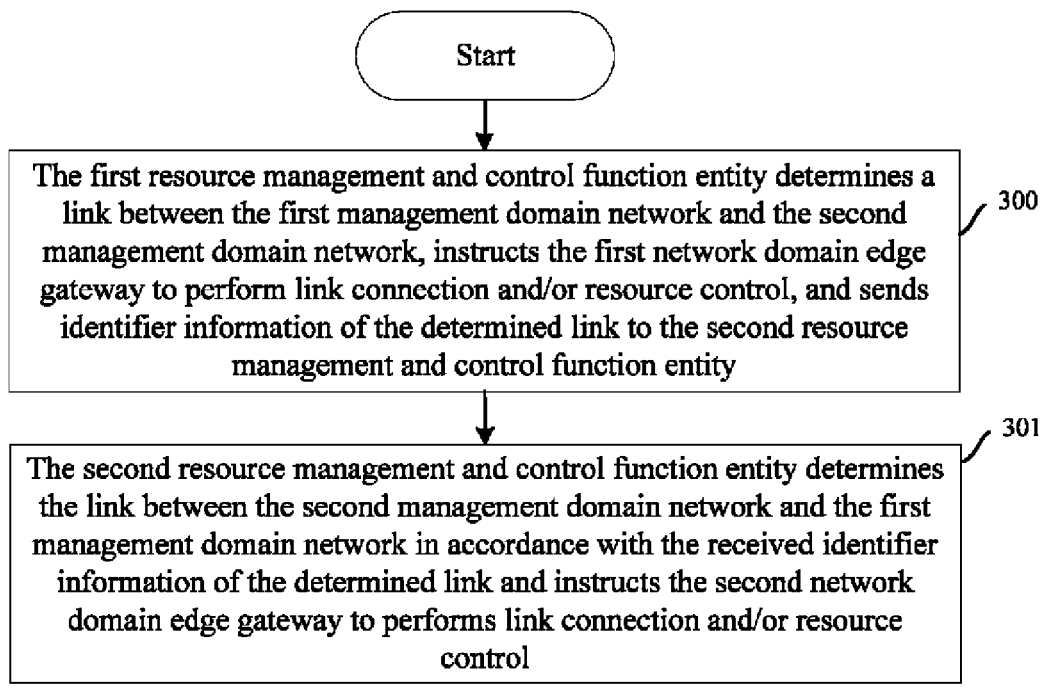
FIG. 3 illustrates a flow chart of a method for selecting an edge connection link across different management domain networks, according to an embodiment of the invention.

FIG. 3 illustrates a flow chart of a method for selecting an edge connection link across different management domain networks according to an embodiment of the invention, which includes the following steps.

Step 300: The first resource management and control function entity determines a link between the first management domain network and the second management domain network, instructs the first network domain edge gateway to perform link connection and/or resource control, and sends identifier information of the determined link to the second resource management and control function entity.

In an embodiment of the invention, the first resource management and control function entity can further send the identifier information of the determined link to the first network domain edge gateway, and the first network domain edge gateway performs link connection and/or resource control in accordance with the received identifier information of the determined link.

Step 301: The second resource management and control function entity determines the link between the second management domain network and the first management domain network, in accordance with the received identifier information of the determined link, and instructs the second network domain edge gateway to perform link connection and/or resource control.

In an embodiment of the invention, the second resource management and control function entity can further send the identifier information of the determined link to the second network domain edge gateway, and the second network domain edge gateway performs link connection and/or resource control, in accordance with the received identifier information of the determined link.

In an embodiment of the invention, the resource management and control function entities can correspond to a SPDF and an A-RACF, or can be resource management and control function entities between the domains, which are arranged in two different core networks, and the domain edge gateways can be a C-BGF and an edge gateway in an access network, which is connected with a core network (e.g. an IP-EDGE), or can be domain edge gateways of two different core networks. Detailed descriptions are given below, taking establishment of a QOS path between an access network and a core network in the NGN as an example.

Figure 1:
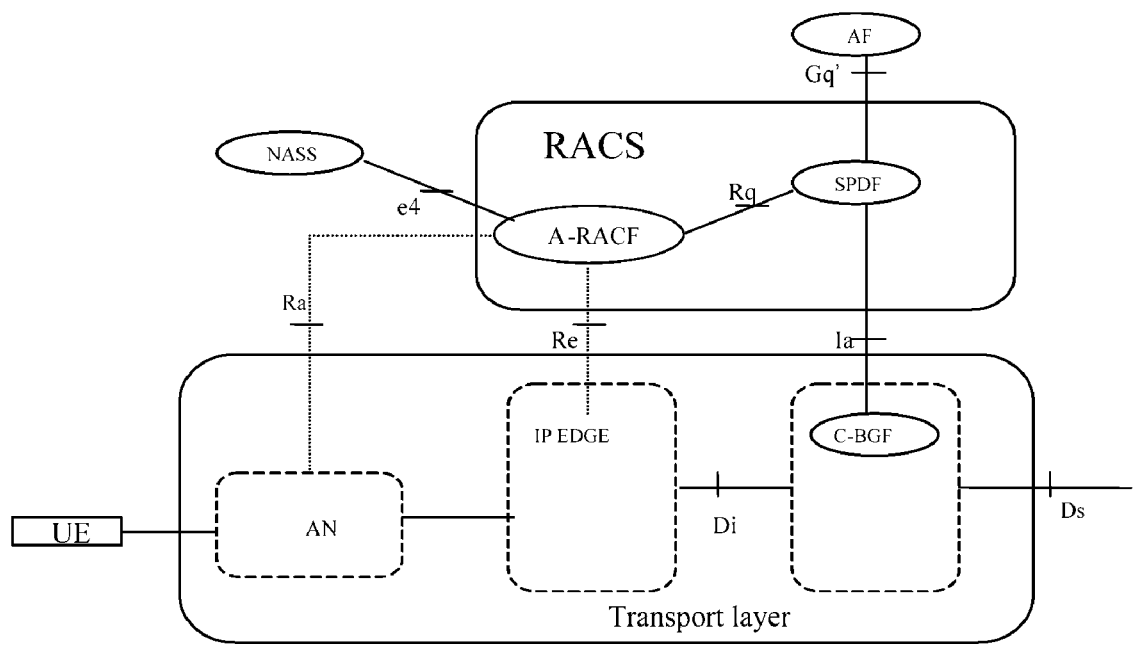
FIG. 1 illustrates a schematic diagram of the QoS control architecture of an access network.
Figure 2:
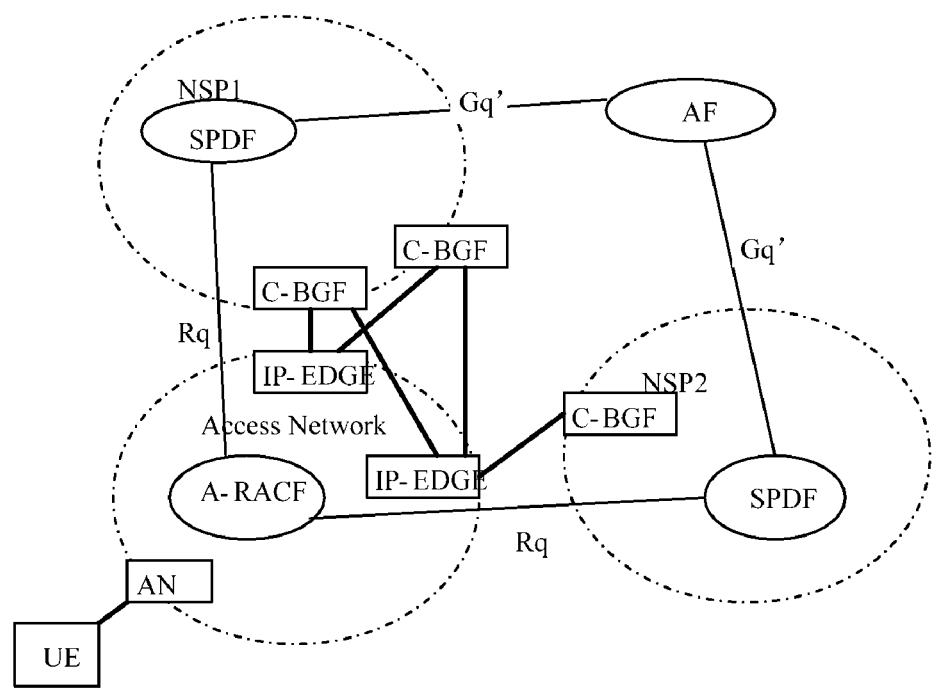
FIG. 2 illustrates a schematic diagram of a relationship between a SPDF and an A-RACF.

Referring to the schematic diagram illustrated in FIG. 1, the SPDF selects a C-BGF at the transport layer, which is connected with the access network, and determines a link between them, instructs the C-BGF to reserve QoS resources of a physical interface corresponding to the link, and then carries identifier information of the selected link between the C-BGF and the access network in an access network resource request and sends the request to the A-RACF via the Rq interface, and the A-RACF determines the link and thereby an IP-EDGE in the access network in accordance with the identifier information in the received access network resource request, and instructs the determined IP-EDGE to reserve QoS resources of a physical interface corresponding to the link, thereby accomplishing selection of the edge connection link.

Alternatively, the SPDF sends the access network resource request to the A-RACF, and the A-RACF determines a corresponding IP-EDGE in accordance with the signaling connection, selects a link over the selected IP-EDGE, which is connected to the C-BGF in the core network, instructs the selected IP-EDGE to reserve QoS resources of a physical interface corresponding to the selected link, and then sends to the SPDF a response to the access network resource request, which carries identifier information of the selected link, and the SPDF determines a C-BGF corresponding to the selected link in accordance with the identifier information of the selected link, which is carried in the received response and instructs the C-BGF to reserve QoS resources of a physical interface corresponding to the link, thereby accomplishing selection of the edge connection link. A correspondence table of SPDF identifiers and IP-EDGEs is required to be set in the A-RACF in order to select the edge connection link in this alternative.

In order to implement selecting of an edge connection link in the above two alternatives, it is further required to set in the A-RACF the identifier information of each link connected with the affiliated access network, a corresponding IP-EDGE and C-BGF at two ends of the link, a physical interface corresponding to the link of the IP-EDGE, and a physical interface corresponding to the link of the C-BGF and to set in the SPDF the identifier information of each link connected with the affiliated core network, a corresponding C-BGF and IP-EDGE at two ends of the link, a physical interface corresponding to the link of the C-BGF, and a physical interface corresponding to the link of the IP-EDGE.

The two alternatives are detailed below.

Figure 4:
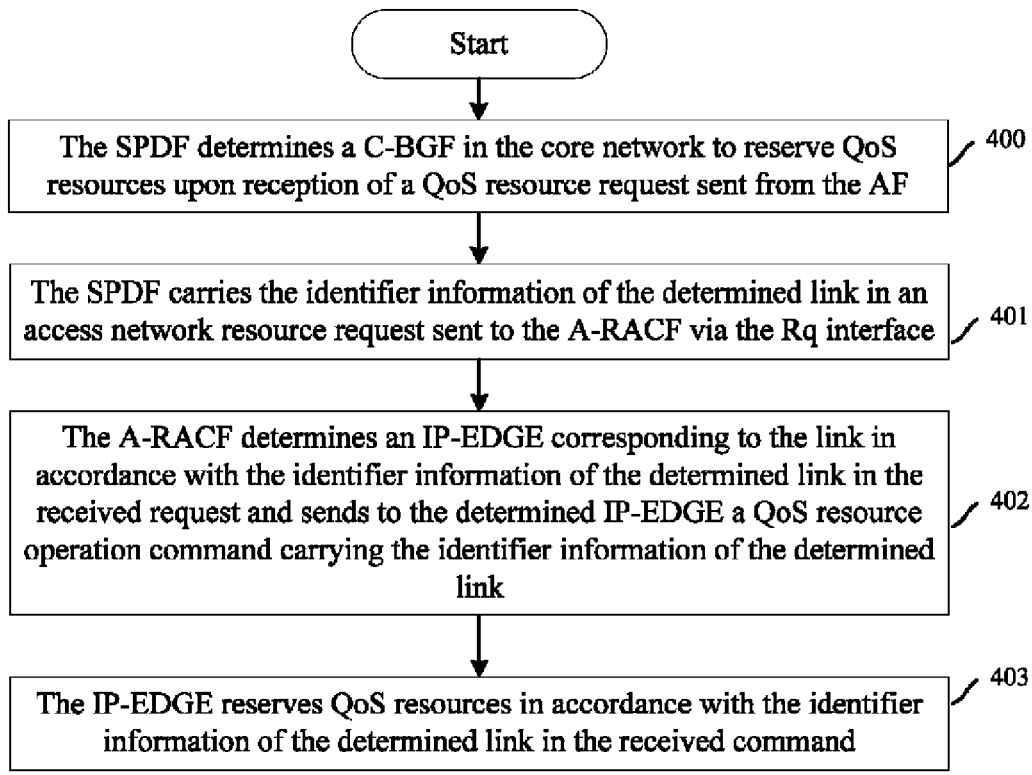
FIG. 4 illustrates a flow chart of a first method for selecting an edge connection link across different management domain networks, according to a preferred embodiment of the invention.

FIG. 4 illustrates a flow chart of a first method for selecting an edge connection link across different management domain networks, according to a preferred embodiment of the invention, which includes the following steps.

Step 400: The SPDF determines a C-BGF in the core network to reserve QoS resources upon reception of a QoS resource request sent from the AF.

In an embodiment of the invention, the SPDF determines during resource reservation for the C-BGF a link connected to an IP-EDGE in the access network and instructs the C-BGF in a QoS resource operation command to reserve the QoS resources of a physical interface corresponding to the determined link.

Step 401: The SPDF carries the identifier information of the determined link in an access network resource request sent to the A-RACF via the Rq interface.

Step 402: The A-RACF determines an IP-EDGE corresponding to the link in accordance with the identifier information of the determined link in the received request, and sends to the determined IP-EDGE a QoS resource operation command carrying the identifier information of the determined link.

Step 403: The IP-EDGE reserves QoS resources in accordance with the identifier information of the determined link in the received command, thereby establishing the link from the IP-EDGE to the C-BGF to enable transmission of a service by the QoS.

During QoS resource reservation, the IP-EDGE reserves the QoS resources of a physical port corresponding to the determined link.

Figure 5:
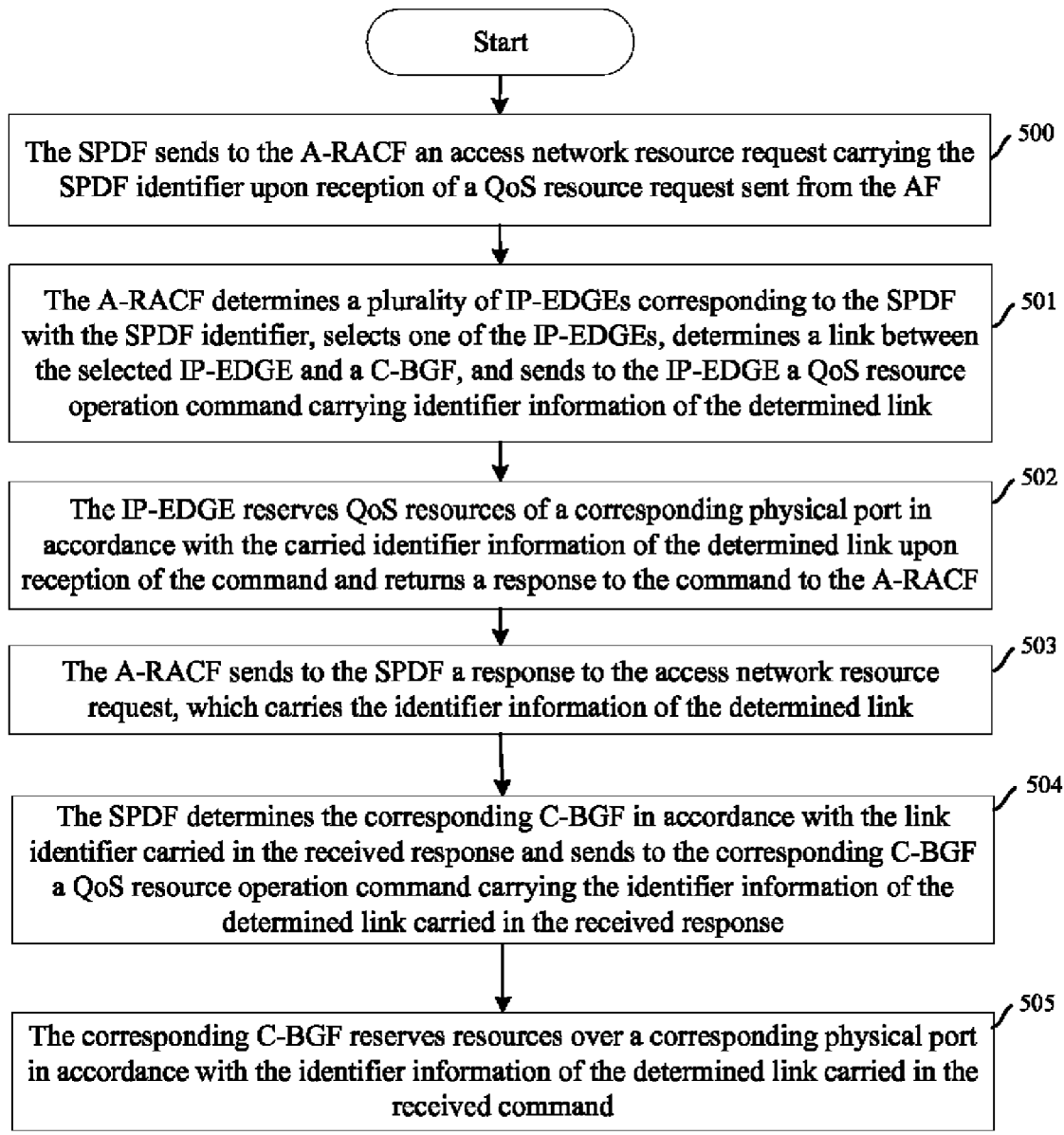
FIG. 5 illustrates a flow chart of a second method for selecting an edge connection link across different management domain networks, according to a preferred embodiment of the invention.

FIG. 5 illustrates a flow chart of a second method for selecting an edge connection link across different management domain networks, according to a preferred embodiment of the invention, which includes the following steps.

Step 500: The SPDF sends to the A-RACF an access network resource request carrying the SPDF identifier, upon reception of a QoS resource request sent from the AF.

Step 501: The A-RACF determines a plurality of IP-EDGEs corresponding to the SPDF with the SPDF identifier in accordance with the SPDF identifier carried in the request, selects one of the IP-EDGEs, determines a link between the selected IP-EDGE and a C-BGF, and sends to the IP-EDGE a QoS resource operation command carrying identifier information of the determined link.

Step 502: The IP-EDGE reserves QoS resources of a corresponding physical port in accordance with the carried identifier information of the determined link upon reception of the command and returns a response to the command to the A-RACF.

Step 503: The A-RACF sends to the SPDF a response to the access network resource request, which carries the identifier information of the determined link.

Step 504: The SPDF determines the corresponding C-BGF in accordance with the link identifier carried in the received response, and sends to the corresponding C-BGF a QoS resource operation command carrying the identifier information of the determined link carried in the received response.

Step 505: The corresponding C-BGF reserves resources over a corresponding physical port in accordance with the identifier information of the determined link carried in the received command, thereby accomplishing selection of the link between the IP-EDGE and the C-BGF.

In an embodiment of the invention, it is also possible to negotiate about selection of an edge link between different management domain networks; that is, one of the management domain networks sends identifier information of all links in compliance with a condition, which are connected with the other management domain network to the other management domain network for its selection. In an embodiment of the invention, the condition can be preset, for example, according to transmission quality, burden, etc. of paths between the networks.

In an embodiment of the invention, different management domain networks can negotiate about selection of a link, and at this time resource management and control function entities in the different management domain networks are required to negotiate about selection of a link, which is described below, taking resource management and control function entities Rm1, Rm2, and Rm2 as an example.

Figure 6:
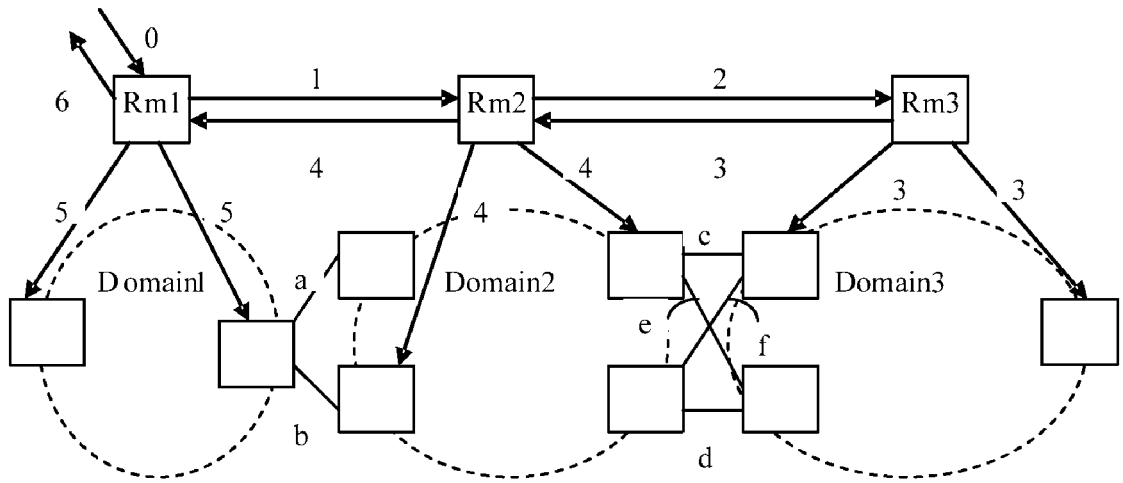
FIG. 6 illustrates a schematic diagram of a method for negotiating about selection of an edge link between different management domain networks, according to an embodiment of the invention.

FIG. 6 illustrates a schematic diagram of a method for negotiating about selection of an edge link between different management domain networks according to an embodiment of the invention, and as illustrated in the figure, there are three different management domain networks, domain1, domain2, and domain3, each of which is provided with its own resource management and control function entity, Rm1, Rm2, and Rm3; there are two links, a and b, respectively, between domain1 and domain2, and there are four links, c, d, e, and f, respectively, between domain 2 and domain 3. Signaling related to interaction of link information between the networks is described below by way of an example.

Step 0: Rm1 receives a request for establishing QoS resources from domain1 through domain2 to domain3.

Step 1: Rm1 sends QoS resource request signal to Rm2, carrying identifier information of link a and link b, because both link a and link b are links between domain1 and domain2.

Step 2: Rm2 determines domain3 to be the next management domain network of the signaling upon reception of the signaling, determines that links to domain3, which are in compliance with a condition, are link c and link f in accordance with statuses of the links, and sends to Rm3 the QoS resource request signaling carrying identifier information of link c and link f, which indicates that the two links are available for selection.

Step 3: Rm3 determines that it is an edge of the signaling, selects link c in accordance with a local resource condition, carries in signaling returned to Rm2 to acknowledge reservation the identifier information of link c, which indicates selection of this link, and also Rm3 operates the local network to reserve QoS resources.

Step 4: Rm2 selects link b upon reception of the acknowledgement signaling returned from Rm3, carries in signaling returned to Rm1 to acknowledge reservation the identifier information of link b, which indicates selection of this link, and also Rm2 operates the local network to reserve QoS resources.

Step 5: Rm1 operates the local network to reserve QoS resources, in accordance with the acknowledgement signaling returned from Rm2.

Step 6: Rm1 acknowledges a success of reserving the QoS resources from domain1 through domain2 to domain3.

In an embodiment of the invention, identifier information of a link includes, but is not limited to, an Internet Protocol (IP) address of a link port, a layer 2 address of the link, e.g. a Medium Access Control (MAC) address, Virtual Local Area Network (VLAN) information, etc., a name or identifier of the link defined commonly by two parties, etc.

The method according to the embodiments of the invention can be applicable not only to the above selection of an edge link between different management domain networks based QoS resources, but also to selection of an edge link between different management domain networks based on other resources, or direct selection of an edge link between different management domain networks.

Figure 7:
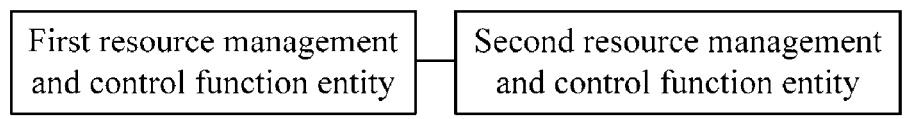
FIG. 7 illustrates a schematic diagram of a system for selecting an edge connection link across different management domain networks, according to an embodiment of the invention.

An embodiment of the invention further provides a system for selecting an edge connection link across different management domain networks as illustrated in FIG. 7, including a first resource management and control function entity in a first management domain network, and a second resource management and control function entity in a second management domain network.

The first resource management and control function entity is adapted to determine a link to the second resource management and control function entities, and to send identifier information of the determined link to the second resource management and control function entity.

The second resource management and control function entity is adapted to determine the link to the first management domain network, in accordance with the received identifier information of the determined link.

In this embodiment, the second management domain network further includes a second network domain edge gateway, wherein:

The second resource management and control function entity is adapted to determine the corresponding second network domain edge gateway in accordance with the received identifier information of the determined link, and send a control command to the second network domain edge gateway in accordance with the identifier information of the determined link, or send the received identifier information of the determined link to the second network domain edge gateway.

The second network domain edge gateway is adapted to perform link connection and/or resource control, in accordance with the control command or the received identifier information of the determined link.

In this embodiment, the first management domain network further includes a first network domain edge gateway.

The first resource management and control function entity is adapted to send a control command or the identifier information of the determined link to the first network domain edge gateway corresponding to the determined link.

The first network domain edge gateway is adapted to perform link connection and/or resource control on the link, in accordance with the control command or the received identifier information of the determined link.

Figure 8:
FIG. 8 illustrates a schematic diagram of a resource management and control function entity, according to an embodiment of the invention.

An embodiment of the invention further provides a resource management and control function entity as illustrated in FIG. 8, including a link selection module and a sending module.

Particularly, the link selection module is adapted to determine a link between management domain networks, to generate identifier information of the determined link, and to generate a control command, in accordance with the identifier information of the determined link.

The sending module is adapted to send the identifier information of the determined link or the control command.

The entity further includes a reception module adapted to send the received identifier information of the determined link, or the control command generated in accordance with the received identifier information of the determined link.

Figure 9:
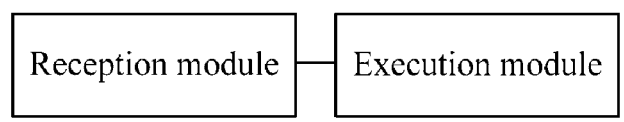
FIG. 9 illustrates a schematic diagram of a network domain edge gateway, according to an embodiment of the invention.

An embodiment of the invention further provides a network domain edge gateway as illustrated in FIG. 9, including a reception module and an execution module.

Particularly, the reception module is adapted to receive identifier information of a determined link or a control command.

The execution module is adapted to perform link connection and/or resource control, in accordance with the identifier information of the determined link or the control command.

The objects, technical schemes, and advantageous effects of the invention have been further described in details with reference to the exemplary embodiments, and it shall be appreciated that the above descriptions are merely illustrative of the embodiments of the invention, but not limitative to the invention and any modifications, equivalents, and improvements made without departing from the spirit and principle of the invention shall fall into the scope of the invention, as defined in the appended claims.

What is claimed is:

1. A method for selecting an edge connection link across different management domain networks, wherein a plurality of finks is provided between a first management domain network and a second management domain network, the first management domain network and the second management domain network are neighbors, and the method comprises:
   determining, by a first resource management and control function device in the first management domain network, a plurality of network domain edge gateways of the first management domain network corresponding to the second management domain network, selecting one of the network domain edge gateways, determining more than one link between the selected one network domain edge gateway and the second management domain network, and sending identifier information of the determined more than one link to a second resource management and control function device of the second management domain network;
   determining, by the second resource management and control function device, the link to the first management domain network, in accordance with the received identifier information of the determined link; and
   the determining, by the second resource management and control function device, the link to the first management domain network further comprises: selecting a link with the corresponding identifier information from the determined more than one link as the determined rink, and sending the identifier information of the determined link to the first resource management and control function device.

2. The method according to claim 1, wherein the second management domain network further comprises a second network domain edge gateway; and the method further comprises: determining, by the second resource management and control function device, the corresponding second network domain edge gateway, in accordance with the received identifier information of the determined link, and controlling the second network domain edge gateway to perform link connection or resource control, in accordance with the identifier information of the determined rink.

3. The method according to claim 1, wherein the second management domain network further comprises a second network domain edge gateway; and the method further comprises: determining, by the second resource management and control function device, the corresponding second network domain edge gateway, in accordance with the received identifier information of the determined link, and sending the received identifier information of the determined link to the second network domain edge gateway, and enforcing, by the second network domain edge gateway, link connection or resource control, in accordance with the received identifier information of the determined link.

4. The method according to claim 1, wherein the first management domain network further comprises a first network domain edge gateway; and before or when sending the identifier information of the determined link to the second resource management and control function device, the method further comprises:
   instructing, by the first resource management and control function device, the first network domain edge gateway corresponding to the determined link to perform link connection or resource control on the link; or sending the identifier information of the determined link to the first network domain edge gateway corresponding to the determined link, and enforcing, by the first network domain edge gateway, link connection or resource control, in accordance with the received identifier information of the determined link.

5. The method according to claim 1, wherein the link between the first management domain network and the second management domain network, which is determined by the first resource management and control function device, is a link selected from the plurality of finks between the first management domain network and the second management domain network, in accordance with a preset rule.

6. The method according to claim 1, wherein the first management domain network further comprises a first network domain edge gateway and the second management domain network, and further comprises a second network domain edge gateway;
   before or when sending the identifier information of the determined link to the first resource management and control function device, the method further comprises: instructing, by the second resource management and control function device, the second network domain edge gateway corresponding to the determined link to perform link connection or resource control on the link; or sending the identifier information of the determined link to the second network domain edge gateway corresponding to the determined link, and enforcing, by the second network domain edge gateway, link connection or resource control, in accordance with the received identifier information of the determined link; and after the first resource management and control function device receives the identifier information of the determined link, the method further comprises: determining the link to the second management domain network, in accordance with the received identifier information of the determined link, and instructing the first network domain edge gateway corresponding to the determined link to perform link connection or resource control on the link; or sending the identifier information of the determined link to the first network domain edge gateway corresponding to the determined link, and enforcing, by the first network domain edge gateway, link connection or resource control, in accordance with the received identifier information of the determined link.

7. The method according to claim 1, wherein when sending the identifier information of the determined link, the method further comprises: sending, by the first resource management and control function device, a resource or connection request to the second resource management and control function device.

8. The method according to claim 1, further comprising: sending, by the second resource management and control function device in the second management domain network, a resource or connection request to the first resource management, and control function device in the first management domain network.

9. The method according to claim 1, wherein the different management domain networks are networks operated by different operators or sub-networks divided in a network operated by the same operator.

10. The method according to claim 1, wherein the identifier information of the determined link is an Internet Protocol IP address of a link port, a layer 2 address of the link, or a name or identifier of the link, determined commonly by the two different management domain networks through a negotiation.

11. A system for selecting an edge connection link across different management domain networks, comprising a first resource management and control function device in a first management domain network, and a second resource management and control function device in a second management domain network, the first management domain network and the second management domain network are neighbors, wherein:

the first resource management and control function device is adapted to determine a plurality of network domain edge gateways of the first management domain network corresponding to the second management domain network, selecting one of the network domain edge gateways, to determine more than one link between the selected one network domain edge gateway and the second resource management and control function entities, and to send identifier information of the determined more than one link to the second resource management and control function device;

the second resource management and control function device is adapted to determine the link to the first management domain network, in accordance with the received identifier information of the determined rink; and the determining the link to the first management domain network, in accordance with the received identifier information of the determined link further comprises: selecting a link with the corresponding identifier information from the determined more than one link as the determined rink, and sending the identifier information of the determined link to the first resource management and control function device.

12. The system according to claim 11, wherein the second management domain network further comprises a second network domain edge gateway, wherein:

the second resource management and control function device is adapted to determine the corresponding second network domain edge gateway, in accordance with the received identifier information of the determined link, and sends a control command to the second network domain edge gateway, in accordance with the identifier information of the determined link, or sends the received identifier information of the determined link to the second network domain edge gateway; and the second network domain edge gateway is adapted to perform link connection or resource control, in accordance with the control command or the received identifier information of the determined link.

13. The system according to claim 11, wherein the first management domain network further comprises a first network domain edge gateway, wherein:

the first resource management and control function device is adapted to send a control command or the identifier information of the determined link to the first network domain edge gateway corresponding to the determined link; and the first network domain edge gateway is adapted to perform link connection or resource control on the link, in accordance with the control command or the received identifier information of the determined link.

14. A resource management and control function device, comprising a processor, which runs a link selection module, a sending module and a reception module, wherein:

the link selection module is adapted to when the resource management and control function device is in a first management domain network, determine a plurality of network domain edge gateways of the first management domain network corresponding to a second management domain network, selecting one of the network domain edge gateways, to determine more than one link between the selected one network domain edge gateway and the second management domain network, the first management domain networks and the second management domain network are neighbors, a plurality of links are provided between the first management domain network and the second management domain network, to generate identifier information of the determined more than one link, and the sending module is adapted to when the resource management and control function device is in a first management domain network, send the identifier information of the determined more than one link to a second resource management and control function device in the second management domain network;

the reception module is adapted to when the resource management and control function device is in the second management domain network, receive identifier information of the determined link from a resource management and control function device in the first management domain network, to determine the link to the first management domain network, in accordance with the received identifier information of the determine link, to select a link with the corresponding identifier information from the determined more than one link as the determined link, to send the identifier information of the determined link to the resource management and control function device in the first management domain network.

* * * * *

UNITED STATES PATENT AND TRADEMARK OFFICE
CERTIFICATE OF CORRECTION

PATENT NO. : 8,072,897 B2  Page 1 of 1
APPLICATION NO. : 12/329270
DATED : December 6, 2011
INVENTOR(S) : Yong Huang It is certified that error appears in the above-identified patent and that said Letters Patent is hereby corrected as shown below:

IN THE CLAIMS:

Column 9, line 48, claim 1, "finks" should read -- links --.

Column 10, line 18, claim 2, "rink" should read -- link --.

Column 11, line 60, claim 11, "rink" should read -- link --.

Column 11, line 67, claim 11, "rink" should read -- link --.

Signed and Sealed this
Twenty-first Day of February, 2012

David J. Kappos
*Director of the United States Patent and Trademark Office*